United States Patent [19]

Ray

[11] Patent Number: 4,520,918

[45] Date of Patent: Jun. 4, 1985

[54] METHOD OF AND APPARATUS FOR PREVENTING SEGREGATION OF AGGREGATE

[75] Inventor: Joe R. Ray, San Jose, Calif.

[73] Assignee: Noble Automated Systems, Inc., San Jose, Calif.

[21] Appl. No.: 407,453

[22] Filed: Aug. 12, 1982

[51] Int. Cl.³ ............................................. B65G 31/00
[52] U.S. Cl. .................................... 198/640; 198/956; 239/650; 193/2 R
[58] Field of Search ............... 198/633, 640, 956, 525, 198/641; 414/293, 299; 193/2 R, 3, 32; 239/650, 672, 673

[56] References Cited

U.S. PATENT DOCUMENTS

| | | | |
|---|---|---|---|
| 705,858 | 7/1902 | McWhorter | 239/650 |
| 962,232 | 6/1910 | Marston | 198/640 |
| 1,381,009 | 6/1921 | Pratt | 198/640 |
| 1,596,026 | 8/1926 | Schei | 198/641 |
| 2,262,768 | 11/1941 | Kaltenbach | 193/3 |
| 2,563,432 | 8/1951 | Sterler | 198/640 |
| 2,577,331 | 12/1951 | Karlsson et al. | 198/640 |
| 2,670,839 | 3/1954 | Aasland | 198/640 |
| 3,081,566 | 3/1963 | Penote et al. | 198/633 X |
| 3,148,763 | 9/1964 | Sawada | 198/525 X |
| 4,181,171 | 1/1980 | Yonemitsu | 414/293 X |
| 4,405,089 | 9/1983 | Taylor | 239/673 X |

FOREIGN PATENT DOCUMENTS 2318687  11/1974  Fed. Rep. of Germany ...... 198/956

Primary Examiner—Joseph E. Valenza
Assistant Examiner—Stuart J. Millman
Attorney, Agent, or Firm—Jack M. Wiseman; Francis W. Anderson

[57] ABSTRACT

Apparatus for preventing segregation of aggregate includes a plurality of vertically disposed chutes at the discharge end of a conveyor, each chute being arranged to intercept a portion of aggregate leaving the conveyor, and direct it downwardly onto a common pile.

7 Claims, 4 Drawing Figures

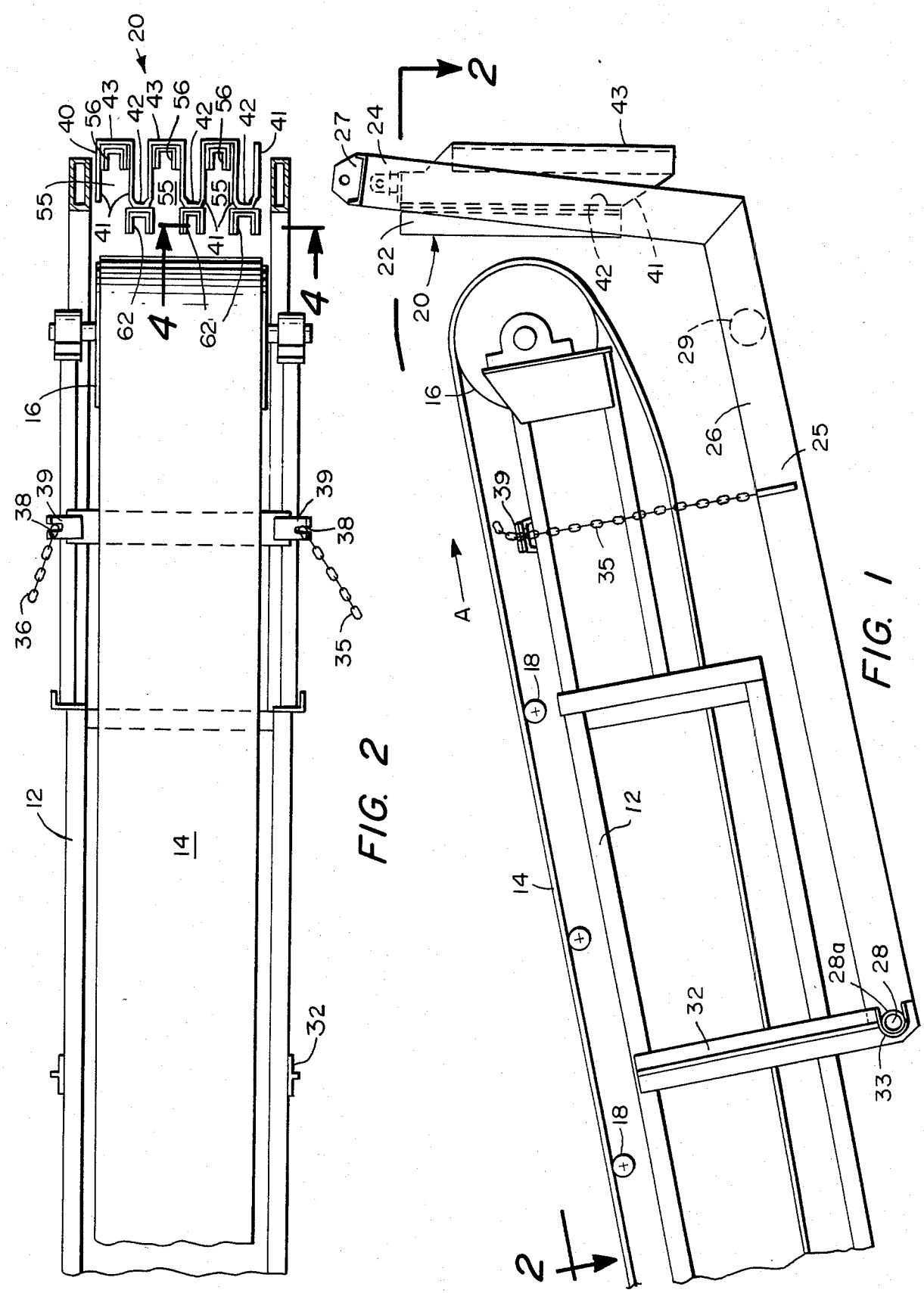

METHOD OF AND APPARATUS FOR PREVENTING SEGREGATION OF AGGREGATE

BACKGROUND OF THE INVENTION

Crushed or processed aggregate of the type used in highways and the like is made up of particles of various sizes ranging from fine aggregate in the 0 to ¼ inch range to coarse aggregate of 4 inch maximum size. Since the finished highway must have certain characteristics of strength and appearance, it is necessary that the aggregate used be evenly graded in various sizes from dust to 1 inch maximum size, for example. Accordingly, in any stockpile of material that is to be used for such work, care must be taken so that the particles do not separate out according to size and the proper mix of particles is maintained during the stockpiling operation.

The most practical method of stockpiling aggregate involves the use of an upwardly inclined belt conveyor which raises the mix and drops it to form a pile. Unfortunately, when the aggregate is discharged over the upper end of the belt, the larger particles tend to follow a different arc than the smaller particles and, as a result, a stockpile is formed which has larger particles accumulated at one side and smaller particles at the other. Loads of aggregate removed from such a stockpile would not be acceptable for use on many projects.

To assure a proper unsegregated mix, some specifications require that stockpiles be formed by hauling truckloads to a particular site, dumping the loads in side-by-side formation, and then drive a dozer or scraper blade across the top of the several piles to push the peaks of the piles into the valleys and thus form a layer. Additional truckloads are then dumped on the first layer to form several adjacent piles, and the peaks are again pushed over to form a second layer. Additional layers are formed until a stockpile of desired height is obtained. Such a procedure is much more time-consuming and expensive than is a procedure using a belt conveyor.

Several arrangements have been proposed for intercepting material as it is discharged over the upper end of an inclined belt conveyor. Most of these devices are concerned only with redirecting the material so that it is deposited at predetermined locations. Such deflector members are disclosed in the patents to Marston, U.S. Pat. Nos. 962,232, Pratt, 1,381,009, Sterler, 2,563,432, Karlsson et al., 2,577,331 and Aasland, 2,670,839. None of these devices are effective to intercept portions of the material discharged by a belt conveyor, confine each portion against both forward and lateral movement, and then redirect each portion downwardly onto a common stockpile.

In accordance with the present invention apparatus is provided which is arranged to be installed at the discharge end of a belt conveyor to prevent separation of particles of different sizes as a stream of aggregate is discharged over the end.

An object of the present invention is to provide a unique method of preventing the separation of particles of different sizes as a mixture of particles of different sizes is discharged from a belt conveyor and a novel apparatus for carrying out the method.

Other and further features and advantages of the present invention will be apparent from the following description of a preferred embodiment.

SUMMARY OF THE INVENTION

The apparatus for carrying out the method of preventing the separation of particles of different sizes includes a unit which provides a plurality of side-by-side vertical channels that are mounted in spaced relation to the upper forward end of an inclined belt conveyor with the channels opening toward the end of the belt and each channel forming a pocket that intercepts a portion of the discharged material and directs it downwardly to the ground.

DESCRIPTION OF THE DRAWINGS

FIG. 1 is a fragmentary, diagrammatic side elevation of a conveyor having the desegregator mechanism of the present invention mounted thereon.

FIG. 2 is a fragmentary, diagrammatic section of the mechanism of FIG. 1 taken on line 2—2 of FIG. 1.

DESCRIPTION OF A PREFERRED EMBODIMENT

Figure 4:
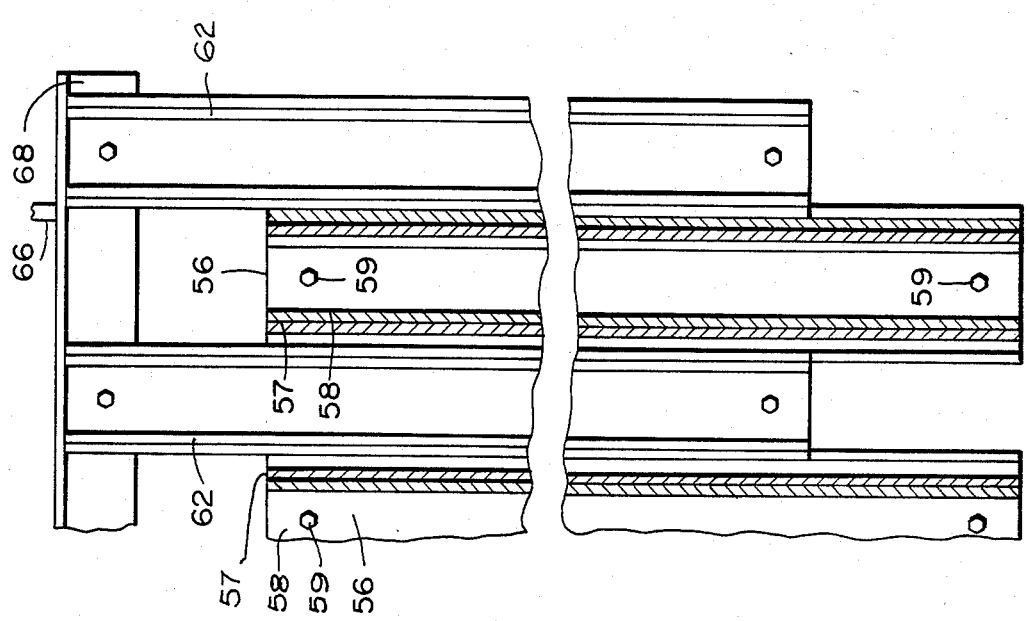
FIG. 4 is a fragmentary vertical section taken along line 4—4 of FIG. 2.

In FIG. 1 the reference numeral 10 indicates generally a material handling conveyor on which the segregation-prevention assembly 20 of the present invention is mounted. The conveyor comprises a rigid frame structure 12 that supports an endless conveying belt 14 on a head pulley 16 and a plurality of support idlers 18. The pulley 16 is driven from a conventional drive mechanism (not shown) to move the belt in the direction of arrow A to carry material to the top of the belt and discharge it over the head pulley.

As material leaves the belt at the head pulley, it is projected into the desegregator unit 20 which directs the material straight downwardly. The unit 20 includes a trough assembly 22 pivotally mounted on a frame 24 that consists of two spaced elongate arms 25 and 26 rigidly connected at one end by a shallow transverse channel 27, at the other end by a transverse cylindrical rod 28, and at an intermediate point by a tube 29. The frame defined by the elongate arms 25 and 26 and the cross braces is approximately as wide as the main conveyor frame 12, and the cylindrical rod 28 has ends 28a (one only being shown) that extend a short distance outwardly from each side of the frame 24. Two support brackets 32, one which is welded to each of the opposite sides of the main frame 12, have sockets 33 at their lower ends, each socket being arranged to pivotally support one of the projecting ends 28a of the rod 28.

The position of the frame 24 relative to the underside of the main frame 12 is controlled by two chains 35 and 36, chain 35 being connected at its lower end to arm 25 as seen in FIG. 1, and the lower end of chain 36 being connected in the same manner to the arm 26. At their upper ends each of the chains is adapted to be disposed in a slot 38 in a retainer tab 39 welded to an upper member of the main frame 12. With this arrangement, if the frame 24 is to be adjusted relative to the main frame 12, the chains are first lifted out of their associated slots. Then the frame 24 is pivoted to the desired position and the chains are re-engaged in the slots 38, with appropriate lengths of chain extending below the tabs.

The trough assembly 22 comprises a frame 40 which has a winding or sinuous configuration in plan, as seen in FIG. 2, and is formed of steel plates and channels welded together to define a plurality of spaced longitudinal walls 41, transverse forward walls 42 adjacent the head pulley 16, and transverse rear walls 43 remote from the head pulley. It will be noted In FIG. 1 that, since the upright walls 41 have downwardly-and-rearwardly slanted top and bottom edges, the top edge of the walls 42 adjacent the head pulley are at a higher elevation than the top edges of the walls 43. Thus, as seen in FIG. 2, the rear transverse walls 43 cooperate with the longitudinal walls 41 to define three forwardly-opening channels, each of which receives a pocket 56 that comprises an outer rigid frame 57 and a rubber insert 58 which is bolted or otherwise secured to the inner faces of the frame. Each pocket is removably secured in one of the chambers by bolts 59, and the bolt holes are so located in the pocket and in the associated wall 43 that the pockets may be reversed, end-for-end so that, if the rubber insert at the upper end of a pocket becomes worn or abraded, the pocket can be repositioned with the worn section at the lower end of the chamber. An equal number of reversible forwardly-opening pockets 62, that are identical to the pockets 56, are bolted to the forward transverse walls 42.

Figure 3:
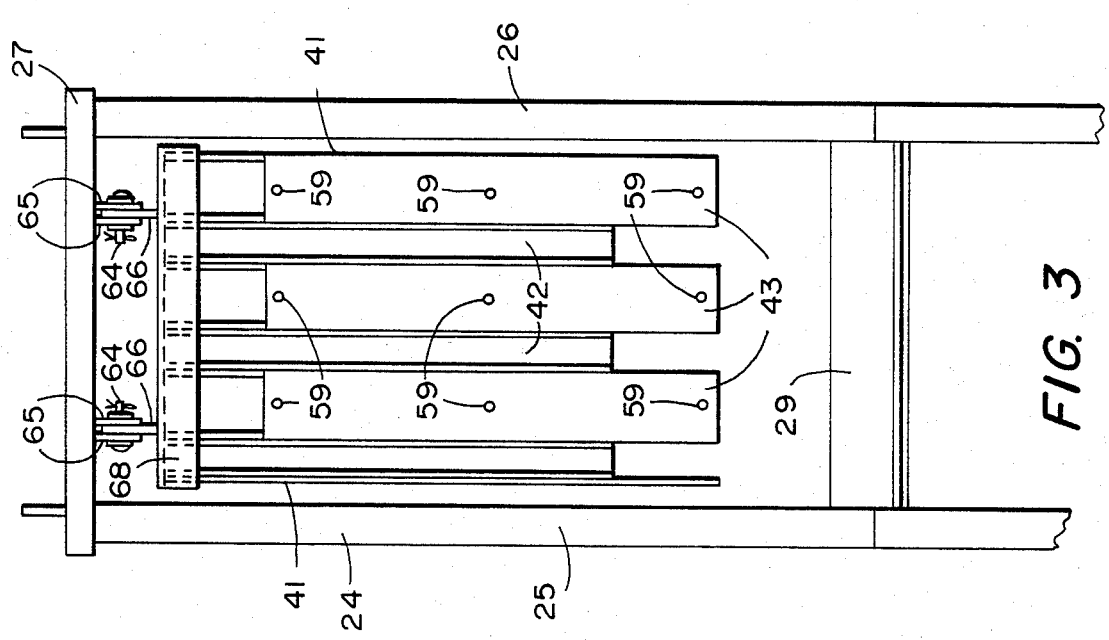
FIG. 3 is a fragmentary end elevation of the mechanism of FIG. 1.

The trough assembly 22 is pivotally supported from the transverse channel 27 of the pivot frame by pins 64 (FIG. 3) extending through tabs 65 depending from the channel 27 and tabs 66 extending upwardly from an angle bar 68 that is welded across the upper ends of the walls 41.

In operation, material discharged over the head pulley 16 is caught in the pockets 62 and 56 before the larger particles separate from the smaller particles. Further, if some smaller particles have separated from the larger particles as a result of the action of the upper run of the conveyor belt as it travels over the idlers, those smaller particles work their way back into the coarser particles due to the forward momentum of the particles as they move over the head pulley, toward the back wall of the pockets. Material discharged from the six pockets lands on the storage pile at six spaced points. Thus, six peaks of unsegregated particles are formed, and the material flows a short distance down the sides of each peak, with no separation of the different size particles, to commingle with the particles from the other peaks to form the main storage pile.

If a rock or the like, which is large enough to become wedged between the conveyor and the trough assembly, is discharged from the end of the conveyor, the trough assembly pivots away from the end of the conveyor, permitting the large rock to fall away from the desegregator.

While the apparatus has been described as being adapted to control the flow of rock aggregate, it will be understood that it is equally effective to handle other types of aggregate such as mineral aggregate such as iron ore or coal. Accordingly, the term "aggregate" will be used in the claims to include aggregate generically.

I claim:

1. Apparatus for preventing separation of different size particles from a mix of aggregate of various size particles as it is discharged from the end of a conveyor comprising a generally upright aggregate intercepting and confining member, and mounting means for mounting said intercepting member adjacent the discharge end of a conveyor, said member comprising a plurality of vertically extending channels disposed side-by-side facing the end of the conveyor, said channels being arranged generally in a square-wave configuration in transverse cross-section, said channels being formed from generally upright rear wall means for intercepting aggregate moving in a first direction away from the end of the conveyor and vertically elongated generally upright side wall means for preventing movement of particles of aggregate laterally of said first direction, said rear wall and side wall means being arranged to guide aggregate directly downwardly in a pile, said member being disposed a selected spaced distance from said discharge end of said conveyor to intercept the aggregate before larger particles separate from smaller particles.

2. The apparatus of claim 1 wherein said mounting means includes an elongate support member having a first end pivotally mounted on the underside of the conveyor and an opposite end disposed adjacent the discharge end of the conveyor.

3. The apparatus of claim 2 further comprising means for adjusting the pivotal position of said support member relative to the conveyor.

4. The apparatus of claim 2 wherein said first end includes a bar mounted transversely of said elongate support member and arranged to engage sockets on the underside of the conveyor.

5. The apparatus of claim 3 wherein said adjusting means comprises retainer clips secured to the conveyor, and chains secured to said elongate support member and adapted to be disposed in said clips to suspend said support member in selected pivotal position below the conveyor.

6. The apparatus of claim 1 wherein said mounting means includes means supporting said intercepting member for free pivotal self-adjusting movement relative to the conveyor.

7. Apparatus for preventing separation of different size particles from a mix of aggregate of various size particles as it is discharged from the end of a conveyor comprising an aggregate intercepting and confining member, and mounting means for mounting said intercepting member adjacent the discharge end of a conveyor, said member comprising a plurality of vertically extending channels disposed side-by-side facing the end of the conveyor, said channels being arranged in generally a square-wave configuration in transverse cross-section, some of said channels being closer to the end of the conveyor than the other channels, said channels being formed from generally upright rear wall means and vertically elongated side wall means to define the square-wave configuration thereof, said channels being disposed a selected distance from said discharge end of said conveyor for intercepting the aggregate before the larger particles separate from the smaller particles.

* * * * *